United States Patent
Shih et al.

(10) Patent No.: US 6,408,570 B1
(45) Date of Patent: Jun. 25, 2002

(54) PLANT CULTIVATION DEVICE

(76) Inventors: Chao-Chang Shih; Shu-Yen Peng Shih, both of No. 77, Yung-Dung St., South Dist., Taichung (TW)

( * ) Notice: Subject to any disclaimer, the term of this patent is extended or adjusted under 35 U.S.C. 154(b) by 0 days.

(21) Appl. No.: 09/632,917

(22) Filed: Aug. 4, 2000

(51) Int. Cl.[7] .............................................. A01G 25/00
(52) U.S. Cl. .............................................. 47/79; 47/82
(58) Field of Search .............................. 47/82, 79, 83, 47/86

(56) References Cited

U.S. PATENT DOCUMENTS

| | | | | |
|---|---|---|---|---|
| 3,063,196 A | * | 11/1962 | Pauer | 47/38 |
| 4,268,994 A | * | 5/1981 | Urai | 47/79 |
| D262,274 S | * | 12/1981 | Lahr | D11/152 |
| 4,704,818 A | * | 11/1987 | Cameron | 47/62 |
| 4,736,543 A | * | 4/1988 | von Bertrab Erdmann | 47/82 |
| D295,842 S | * | 5/1988 | Gay | D11/143 |
| 5,276,997 A | * | 1/1994 | Swearengin et al. | 47/82 |
| 5,363,594 A | * | 11/1994 | Davis | 47/82 |
| 5,440,836 A | * | 8/1995 | Lee | 47/60 |
| 5,555,676 A | * | 9/1996 | Lund | 47/82 |
| 5,724,768 A | * | 3/1998 | Ammann, Jr. | 47/62 |
| D429,661 S | * | 8/2000 | Yano | D11/146 |

* cited by examiner

Primary Examiner—Peter M. Poon
Assistant Examiner—Bethany L Griles
(74) Attorney, Agent, or Firm—Charles E. Baxley

(57) ABSTRACT

A plant cultivation device includes a plate having a top edge, a lower edge and two ends, wherein the two ends are connected with each other so as to form a tubular object in which medium is filled. A plurality of holes are defined therethrough and young plants are planted in the medium via the holes. A netted member is engaged with an inner periphery of the plate and located close to the lower edge of the plate so as to prevent the medium from flowing from the device.

17 Claims, 7 Drawing Sheets

PLANT CULTIVATION DEVICE

FIELD OF THE INVENTION

The present invention relates to a plant cultivation device that is enclosed by connecting two ends of a plate and a plurality of holes are defined through the plate. Medium is filled in the space enclosed by the plate and plants are planted in the medium through the holes.

BACKGROUND OF THE INVENTION

A conventional plant cultivation device is shown in FIG. 1 and generally includes a frame 11 and two plant pans 10 are supported on the frame 11 arranged as an inverted V-shaped arrangement. Each plant pan 10 is filled with medium 12 and young plants are planted in the medium 12. However, the conventional cultivation device wastes too much space below the device so that the use of the space and land is not efficient and satisfied when measured by modern cultivation level. Furthermore, water and fertilizer in the medium will flow out from the peripheral flanges of the pans 10 because of the inclination of the plate pans 10.

The present invention intends to provide a plant cultivation device that economically uses the space and the young plants are evenly taken care by sunshine, water and fertilizer.

SUMMARY OF THE INVENTION

In accordance with one aspect of the present invention, there is provided a plant cultivation device and comprising a plate having a top edge, a lower edge and two ends. The two ends of the plate are engaged with each other and a plurality of holes are defined through the plate. A netted member is engaged with an inner periphery of the plate and located close to the lower edge of the plate. Medium is filled in a space enclosed by the plate and young plants are planted in the medium via the holes.

The primary object of the present invention is to provide a plant cultivation device that has a compact size and many young plants can be planted to the device.

These and further objects, features and advantages of the present invention will become more obvious from the following description wheaten in connection with the accompanying drawings which show, for purposes of illustration only, several embodiments in accordance with the present invention.

DETAILED DESCRIPTION OF THE PREFERRED EMBODIMENTS

Figure 1:
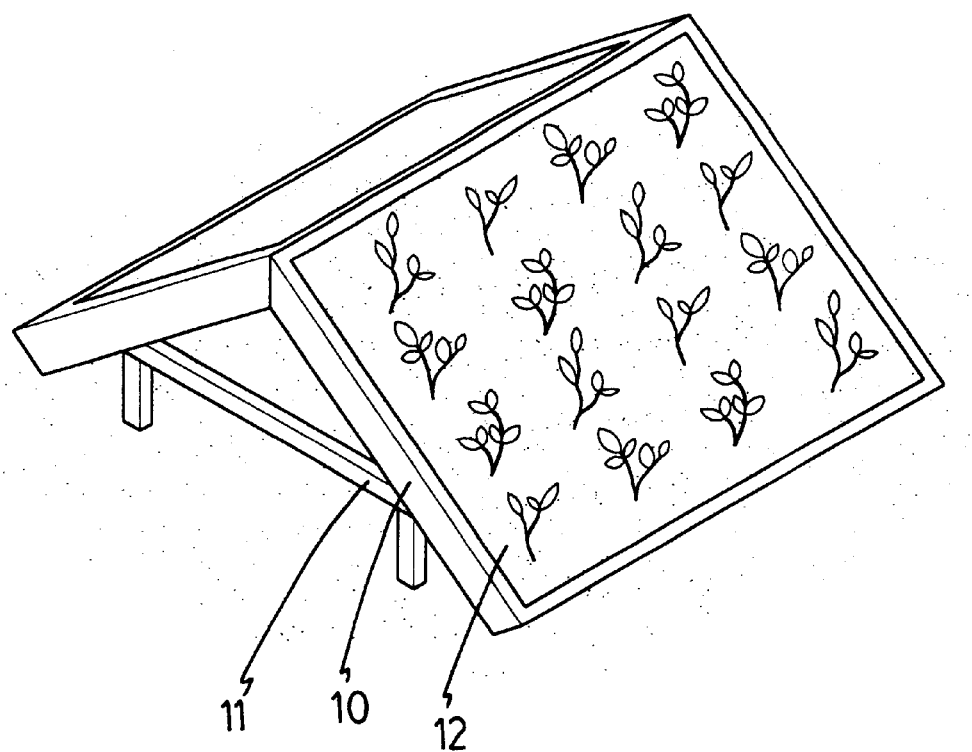
FIG. 1 is a perspective view to show a conventional plant cultivation device.
Figure 2:
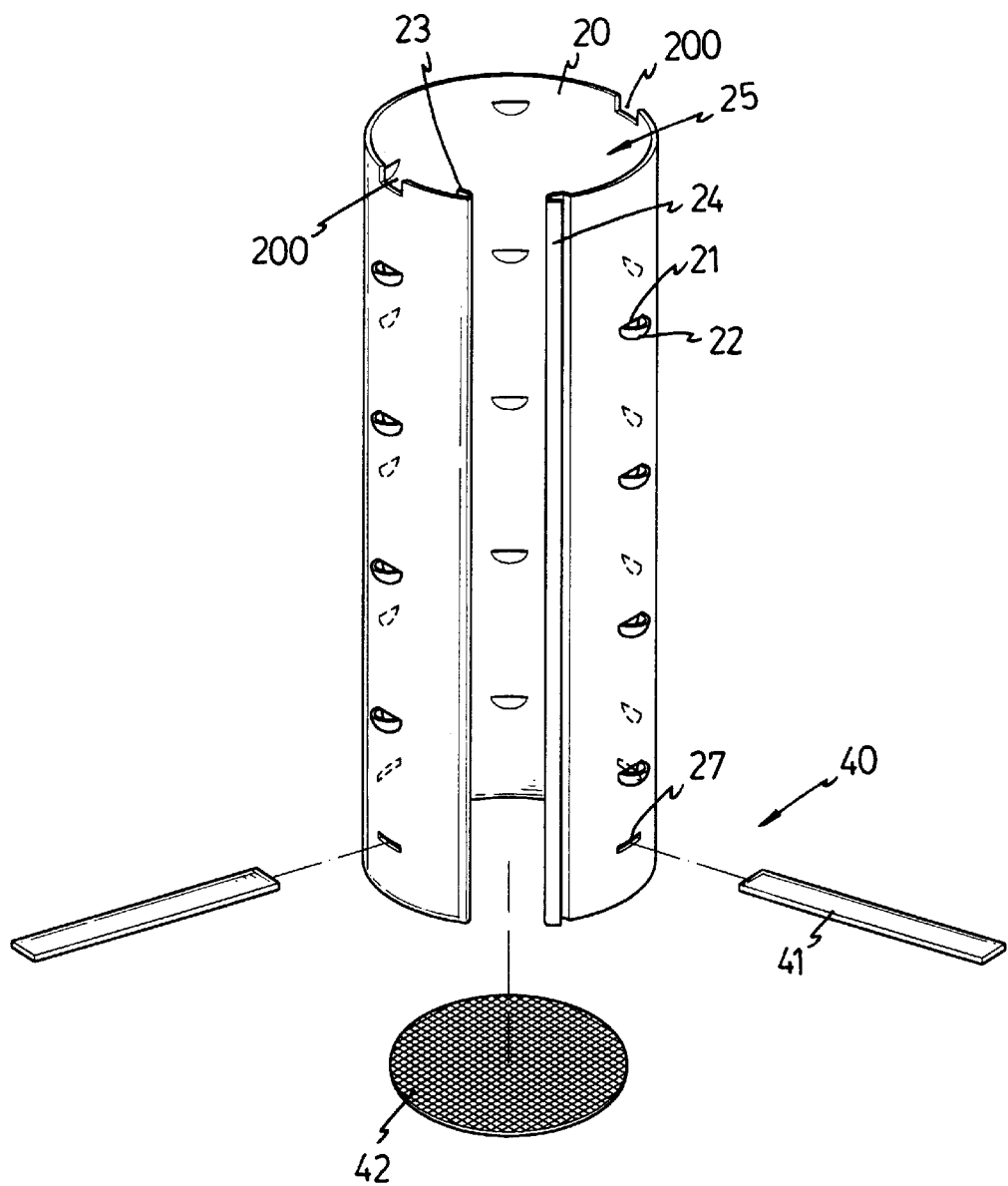
FIG. 2 is an exploded view to show a plant cultivation device of the present invention.
Figure 3:
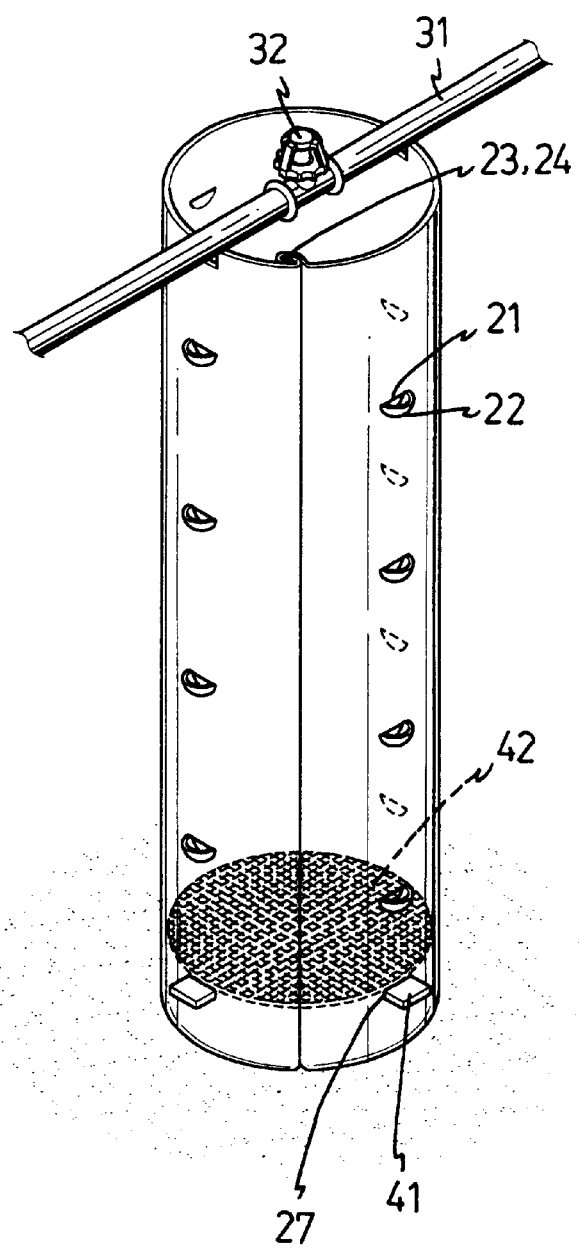
FIG. 3 is a cross sectional view to show young plants are planted in the plant cultivation device of the present invention.
Figure 4:
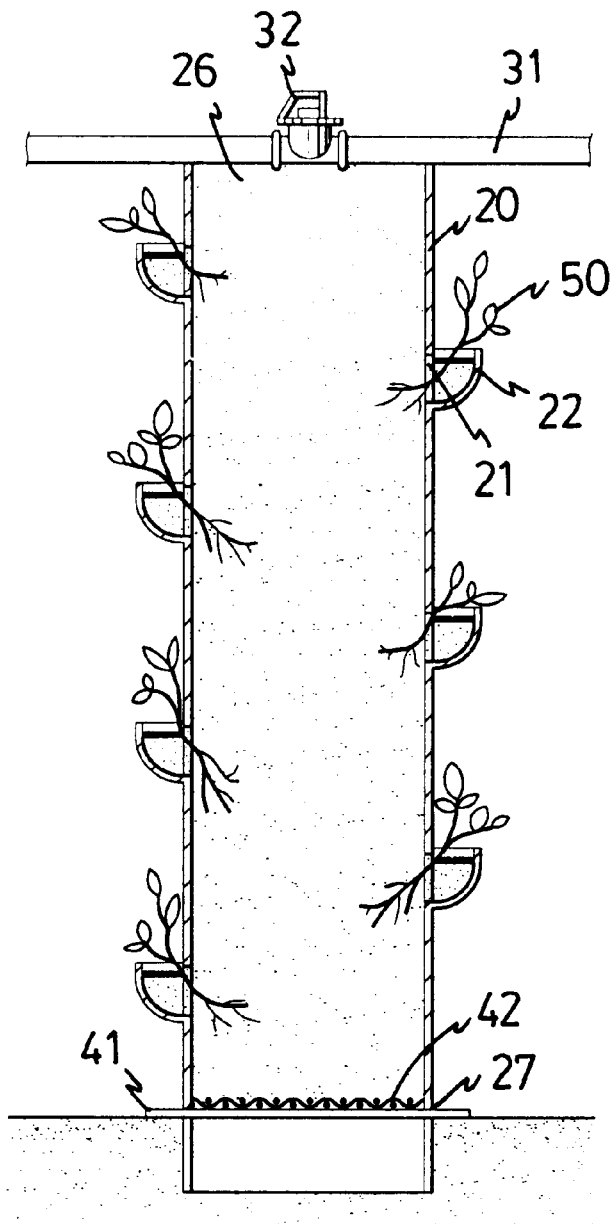
FIG. 4 is a perspective view to show plant cultivation device of the present invention.

Referring to FIGS. 2 to 4, a plant cultivation device of the present invention comprises a plate 20 having a top edge, a lower edge and two ends. The plate 20 is flexible and each of the two ends has a hook 23/24 and the two hooks 23, 24 are engaged with each other so as to form a tubular object and a space is enclosed by the plate 20. Medium 26 is filled in the space enclosed by the plate 20. A plurality of holes 21 are defined through the plate 20 and a plurality of cup portions 22 extend from the plate 20 and each cup portion 22 extends from a periphery of each hole 21 in the plate 20. The plate 20 has two slots 27 defined therethrough and are located close to the lower edge. A support means 40 including two boards 41 which extend through the slots 27 and form a cruciform support frame in the space. A netted member 42 is then supported on the support frame and engaged with an inner periphery of the plate 20. Two notches 200 are defined in the top edge of the plate 20 and hose 31 is engaged with the two notches 200. An emitter 32 is connected to the hose 31 so that the emitter 32 sprinkles water to the medium 26 as desired or needed and is controlled by users. Young plants 50 are planted in the medium 26 in the device via the holes 22 so that the number of the young plants is large for each device and each young plant 50 is evenly provided with water, sun shine and fertilizer. The netted member 42 effectively prevents the medium 26 from loss during watering.

Figure 5:
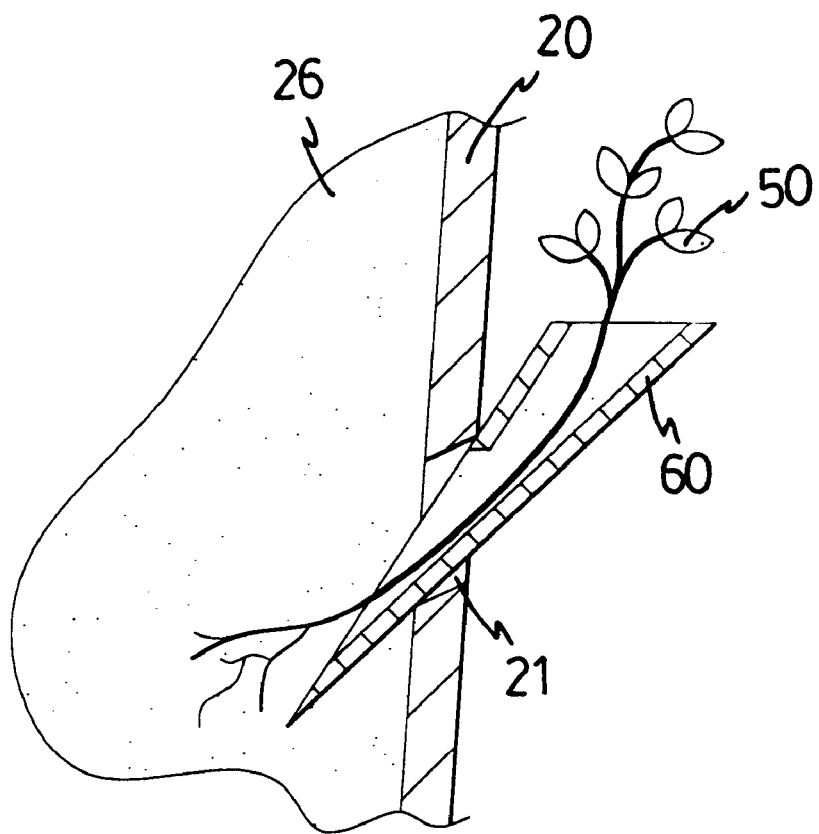
FIG. 5 is another embodiment of the plant cultivation device of the present invention.
Figure 6:
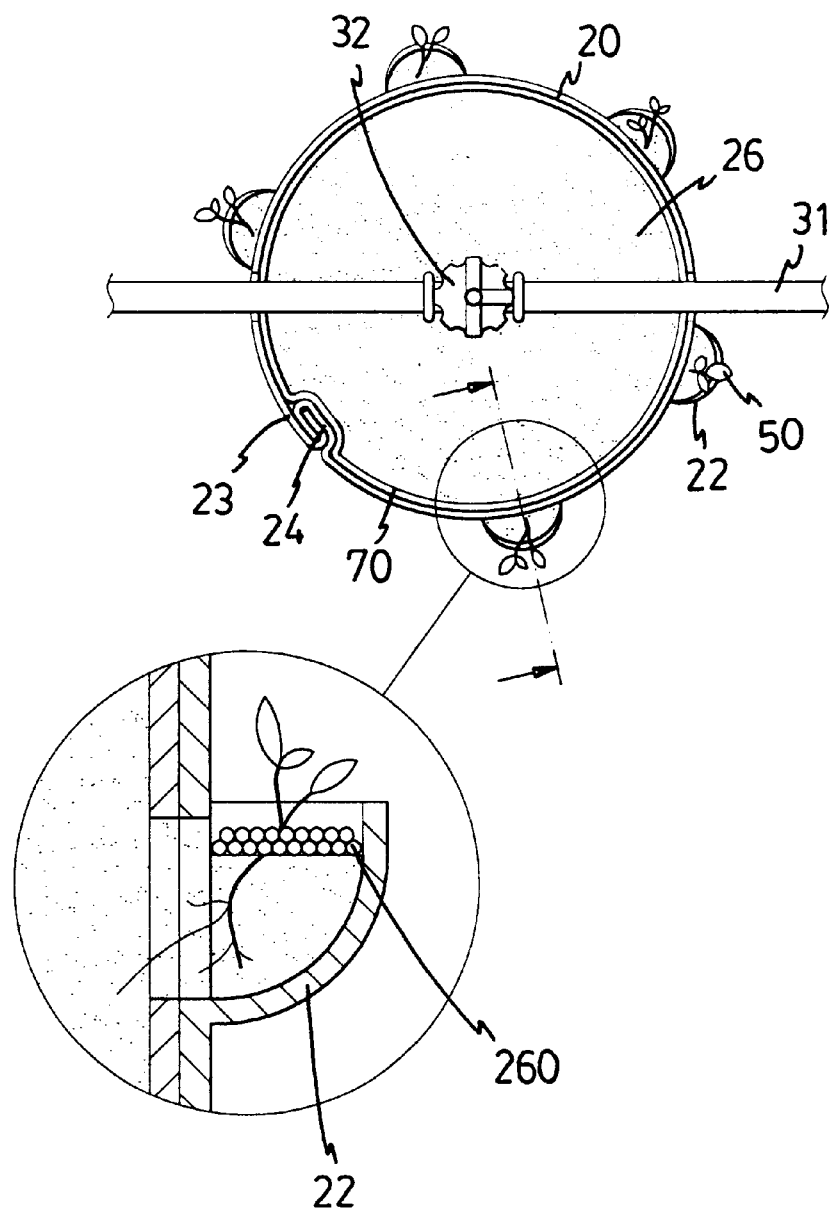
FIG. 6 is a top view to show the plant cultivation device of the present invention.
Figure 7:
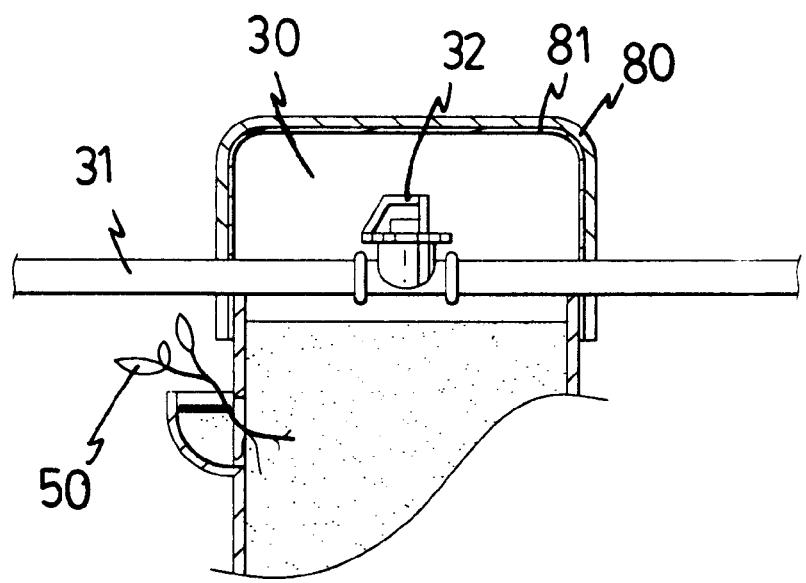
FIG. 7 shows a cap is connected to a top of the plant cultivation device of the present invention.

FIG. 5 shows that an insertion member 60 is inserted into each hole 21 and the wedge-shaped insertion member 60 has two open ends so that a young plant 50 can be planted in the medium 26 via the insertion member 60. The insertion member 60 extends from the plate 20 so that the young plant 50 can be supported at a distance from the plate 20. FIG. 6 shows that a heat isolation layer 70 is connected to the inner periphery of the plate 20 so as to keep the young plants 50 under controlled temperature. The heat isolation layer 70 maintains the temperature of the medium 26 to keep the plants under optimum condition, and the roots of the young plants 50 will not be incurred by too low temperature. The heat isolation layer 70 has holes which are in alignment with the holes 21 in the plate 20 so that the roots of the young plants 50 can extend into the medium 26. A layer of grain 260 can be spread on a top of medium in the cup portions 22 so as to perform as a heat isolated layer to protect the medium 26 in the cup portions 22. FIG. 7 shows that a cap 80 is mounted to the top edge of the plate 20 and the emitter 32 is covered by the cap 80 so as to prevent other objects, such as rains from entering the medium 26. By this cap 80, a rinse effect can be avoided, and the water and nutrients status can be maintained. A heat isolation layer 81 is attached to an inner periphery of the cap 81 to obtain desired temperature when the device is used in areas having extreme weather condition.

The device of the present invention occupies a very limited space and a number of young plants 50 can be planted in the device so as to increase the efficiency of use of space. The arrangement and positions of the holes 21 can be controlled according to practical needs and the device is easily to be manufactured so that the manufacturing cost is low. The medium 26 in the device can be replaced easily and promptly.

While we have shown and described various embodiments in accordance with the present invention, it should be clear to those skilled in the art that further embodiments may be made without departing from the scope and spirit of the present invention.

What is claimed is:
1. A plant cultivation device comprising:
   a plate having a top edge, a lower edge and two ends, a plurality of holes defined therethrough and said two ends of said plate being engaged with each other, and said plate having two slots defined therethrough and two boards extending through said slots and located close to said lower edge of said plate, a netted member supported on said two boards and located transversely relative to a longitudinal axis of the plate.

2. The plant cultivation device as claimed in claim 1 further comprising two hooks respectively located on said two ends of said plate, said two hooks engaged with each other.

3. The plant cultivation device as claimed in claim 1 further comprising two notches defined in said top edge of said plate and hose engaged with said two notches, an emitter connected to said hose.

4. The plant cultivation device as claimed in claim 3 further comprising a cap mounted to said top edge of said plate and said emitter being covered by said cap.

5. The plant cultivation device as claimed in claim 1 further comprising a heat isolated layer connected to an inner periphery of a cap.

6. The plant cultivation device as claimed in claim 1 further comprising a plurality of cup portions extending from said plate and each cup portion extending from a periphery of each hole in said plate.

7. The plant cultivation device as claimed in claim 1 further comprising a heat isolation layer connected to the inner periphery of said plate.

8. The plant cultivation device as claimed in claim 1 further comprising an insertion member inserted into each hole in said plate and said insertion member having two open ends.

9. A plant cultivation device comprising:

a plate having a top edge, a lower edge and two ends, a plurality of holes defined therethrough and said two ends of said plate being engaged with each other, two notches defined in said top edge of said plate and a hose engaged with said two notches, an emitter connected to said hose, and a netted member engaged with an inner periphery of said plate and located close to said lower edge of said plate.

10. The plant cultivation device as claimed in claim 9 further comprising a support means engaged with said inner periphery of said plate and said netted member supported on said support means.

11. The plant cultivation device as claimed in claim 9 wherein a support means includes two boards and said plate has two slots defined therethrough, said two boards extending through said slots.

12. The plant cultivation device as claimed in claim 9 further comprising two hooks respectively located on said two ends of said plate, said two hooks engaged with each other.

13. The plant cultivation device as claimed in claim 9 further comprising a cap mounted to said top edge of said plate and said emitter being covered by said cap.

14. The plant cultivation device as claimed in claim 9 further comprising a heat isolated layer connected to an inner periphery of a cap.

15. The plant cultivation device as claimed in claim 9 further comprising a plurality of cup portions extending from said plate and each cup portion extending from a periphery of each hole in said plate.

16. The plant cultivation device as claimed in claim 9 further comprising a heat isolation layer connected to an inner periphery of said plate.

17. The plant cultivation device as claimed in claim 9 further comprising an insertion member inserted into each hole in said plate and said insertion member having two open ends.

* * * * *